No. 679,715. Patented July 30, 1901.
A. R. WORMWOOD.
SPOON HOLDER.
(Application filed Mar. 8, 1901.)

(No Model.)

Witnesses.
Marion Richards.
Ella M. Hansen.

Inventor.
Alfred R. Wormwood
by
Vernie A. Clifford
Attorneys.

UNITED STATES PATENT OFFICE.

ALFRED R. WORMWOOD, OF PORTLAND, MAINE, ASSIGNOR OF ONE-HALF TO WALTER FICHETT, OF SAME PLACE.

SPOON-HOLDER.

SPECIFICATION forming part of Letters Patent No. 679,715, dated July 30, 1901.

Application filed March 8, 1901. Serial No. 50,332. (No model.)

*To all whom it may concern:*

Be it known that I, ALFRED R. WORMWOOD, a citizen of the United States, residing at Portland, in the county of Cumberland and State of Maine, have invented certain new and useful Improvements in Spoon-Holders; and I do hereby declare the following to be a full, clear, and exact description of the invention, such as will enable others skilled in the art to which it appertains to make and use the same.

My invention relates to improvements in spoon-holders, and it especially relates to that class of spoon-holders which may be readily attached to or removed from the side of a kettle or saucepan, so that the spoon may be placed thereon and kept from slipping and so that it will not interfere with placing a cover upon the kettle or saucepan.

Figure 1:
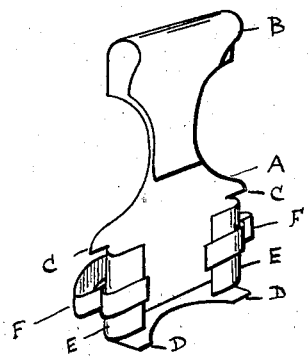
Figure 2:
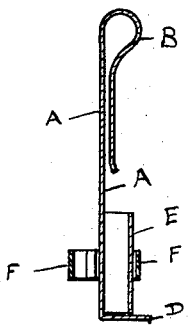
Figure 3:
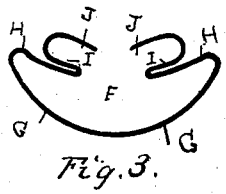

In the drawings herewith accompanying and forming a part of this application, Figure 1 is a perspective view of my improved spoon-holder. Fig. 2 is a vertical section. Fig. 3 is a detail of the removable spring.

Same letters of reference refer to like parts in all the figures.

In said drawings, A represents a plate, preferably made of metal, which has a spring-clasp B at the upper portion thereof, which clasp is adapted to be sprung over the edge of the utensil on which the holder is used. Said plate is also provided with stops C and a projecting lower portion D, which portion is adapted to rest against the inside of the kettle or utensil upon which the holder is used and to serve as additional means for preventing said holder from being displaced. A part of the plate A is cut away and folded back on itself, as seen at E, so as to allow for the placing of the removable spring F thereon and to allow sufficient surface for the binding of the same thereon. Adapted to be removably mounted upon said base portion between the stops C and base portion D is a spring F, (shown in detail in Fig. 3,) said spring being of sufficient strength to sustain a spoon or ladle when placed thereon and of such configuration as to readily clasp the base-plate and to hold itself in any position in which it is placed. Said spring is adapted also, if so desired, to be placed upon the handle of a saucepan or even upon the handle of the spoon and prevent the same from slipping into the utensil, especially when the spoon upon which it is placed is used in shallow dishes. Said spring consists of a single piece of material and comprises a portion G curved in outline, then bent back upon itself, as seen at H, then bent again in the opposite direction, as seen at I, so as to form the loops J, the spring being made in this form so as to readily clasp the sides of the base and at the same time to offer a sufficient rest for the bowl of the spoon. In order that spoons of different sizes may be readily used, the removable spring F can be raised or lowered as desired, it being my intention to make the space between the stops C and base portion D of such size that by moving the spring F either upwardly or downwardly spoons having bowls of various sizes may be easily held thereon.

In practice my device is applied to and used upon a kettle or similar article in the following manner: The clasp is opened enough to allow the same to be sprung over the side of the kettle, the end of the clasp being on the outside thereof. This brings the body portion of the holder and the removable spring on the inside of the kettle and sufficiently below the top thereof as to not prevent the cover from being placed thereon. When the utensil is used for cooking materials that require frequent stirring and a spoon is needed for the same, the spoon is placed on the holder bowl down, the handle of course projecting above the edge of the vessel. This keeps the handle cool and does not prevent the placing of the cover on the vessel, for the thickness of the ordinary spoon is not sufficient to make any material difference. If it is deemed desirable, the removable spring may be taken from the base and attached to the handle of a spoon or ladle. When used in this way, the spring serves as a stop to prevent the spoon or ladle from slipping into the dish.

Having thus described my invention and its use, I claim—

1. As a new article of manufacture, a spoon-holder consisting of a suitable base portion, a spring-clasp at one end, rearwardly-extending shoulders on the opposite end and a removable and adjustable spring adapted to be placed on said base and to be moved vertically thereon.

2. As a new article of manufacture, a spoon-holder consisting of a base portion with a spring-clamp at the upper end and at the lower end rearwardly-extending shoulders, stops on said base portion between the spring-clamp and rearwardly-extending shoulders and a removable spring adapted to engage said base portion and to be moved vertically thereon, the vertical movement of said spring being limited to the space between the rearwardly-extending shoulders and the stops.

3. As a new article of manufacture, a spoon-holder having a base portion with a spring-clasp at one end and rearwardly-extending shoulders at the other end, a part of said base being cut away and folded back upon itself to form stops, an adjustable and removable spring adapted to engage the base between said shoulders and stops and adapted to be moved vertically thereon.

In testimony whereof I affix my signature, in presence of two witnesses, this 28th day of February, 1901.

ALFRED R. WORMWOOD.

Witnesses:
NATHAN CLIFFORD,
ELGIN C. VERRILL.

It is hereby certified that the name of the assignee in Letters Patent No. 679,715, granted July 30, 1901, upon the application of Alfred R. Wormwood, of Portland, Maine, for an improvement in "Spoon-Holders," was erroneously printed "Walter Fichett, whereas said name should have been printed *Walter Fickett;* and that the said Letters Patent should be read with this correction therein that the same may conform to the record of the case in the Patent Office.

Signed, countersigned, and sealed this 20th day of August, A. D., 1901.

[SEAL.]
THOS. RYAN,
*First Assistant Secretary of the Interior.*

Countersigned:
E. B. MOORE,
*Acting Commissioner of Patents.*